US008985463B2

(12) United States Patent
Decoux et al.

(10) Patent No.: US 8,985,463 B2
(45) Date of Patent: Mar. 24, 2015

(54) SECURITY MARKING AUTHENTICATION DEVICE

(75) Inventors: Eric Decoux, Matran (CH); Andrea Callegari, Chavannes-Prés-Renens (CH)

(73) Assignee: Sicpa Holding SA, Prilly (CH)

( * ) Notice: Subject to any disclaimer, the term of this patent is extended or adjusted under 35 U.S.C. 154(b) by 1143 days.

(21) Appl. No.: 12/681,753

(22) PCT Filed: Oct. 9, 2007

(86) PCT No.: PCT/IB2007/003002
§ 371 (c)(1), (2), (4) Date: Apr. 5, 2010

(87) PCT Pub. No.: WO2009/047579
PCT Pub. Date: Apr. 16, 2009

(65) Prior Publication Data

US 2010/0219251 A1 Sep. 2, 2010

(51) Int. Cl.
*G06K 7/10* (2006.01)
*G07D 7/00* (2006.01)
*G07D 7/12* (2006.01)

(52) U.S. Cl.
CPC ... *G07D 7/00* (2013.01); *G07D 7/12* (2013.01)
USPC .......... 235/470

(58) Field of Classification Search
CPC .......... B42D 2035/42; B42D 15/10; B42D 2033/26; B41M 5/262; G02B 27/283; G06K 19/14
USPC .......... 235/470
See application file for complete search history.

(56) References Cited

U.S. PATENT DOCUMENTS

| | | | | |
|---|---|---|---|---|
| 3,766,061 A | | 10/1973 | Mahler et al. | |
| 4,281,342 A | * | 7/1981 | Ueda et al. | 348/94 |
| 5,767,483 A | * | 6/1998 | Cameron et al. | 219/121.85 |
| 5,844,682 A | * | 12/1998 | Kiyomoto et al. | 356/237.1 |
| 6,404,904 B1 | | 6/2002 | Einighammer et al. | |
| 6,570,648 B1 | | 5/2003 | Muller-Rees et al. | |
| 6,597,426 B1 | | 7/2003 | Siemensmeyer et al. | |
| 6,641,874 B2 | | 11/2003 | Kuntz et al. | |

(Continued)

FOREIGN PATENT DOCUMENTS

| | | |
|---|---|---|
| CN | 1668478 | 9/2005 |
| DE | 44 18 490 | 11/1995 |

(Continued)

OTHER PUBLICATIONS

Fergason, J.L., "Cholesteric Structure—I Optical Properties," *Molecular Crystals*, (1966), vol. 1, pp. 293-307.

(Continued)

*Primary Examiner* — Thien M Le
*Assistant Examiner* — Tae Kim
(74) *Attorney, Agent, or Firm* — Greenblum & Bernstein, P.L.C.

(57) ABSTRACT

The invention discloses an authentication device for the visual authentication of a document or item comprising a circular polarizing security marking, said device comprising a light source and polarization filters for the either parallel or alternate illumination of said marking on said document with left- and right-circular polarized light. Corresponding methods for the visual and the automated authentication of the marking are disclosed as well.

9 Claims, 13 Drawing Sheets

(56) References Cited

U.S. PATENT DOCUMENTS

Figure 1:
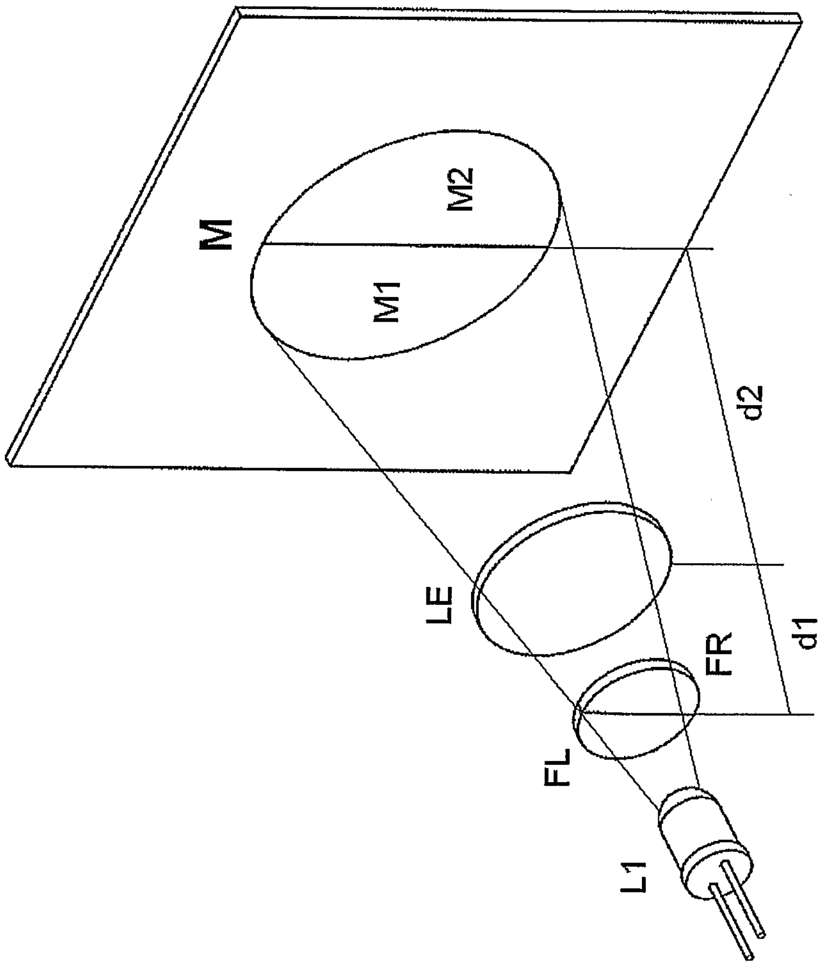

| | | | |
|---|---|---|---|
| 7,537,161 B2 | 5/2009 | Mayer et al. | |
| 7,667,894 B2 | 2/2010 | Hoffmuller et al. | |
| 7,728,931 B2 | 6/2010 | Hoffmuller et al. | |
| 2002/0000472 A1* | 1/2002 | Hattersley et al. | 235/472.01 |
| 2002/0101566 A1* | 8/2002 | Elsner et al. | 351/200 |
| 2002/0194494 A1 | 12/2002 | Egger et al. | |
| 2005/0121619 A1 | 6/2005 | Aleu | |
| 2006/0124741 A1* | 6/2006 | Mayer et al. | 235/454 |
| 2007/0159671 A1* | 7/2007 | Hoshino et al. | 359/2 |
| 2007/0216518 A1 | 9/2007 | Hoffmuller | |
| 2007/0229928 A1 | 10/2007 | Hoffmuller et al. | |

FOREIGN PATENT DOCUMENTS

| | | |
|---|---|---|
| DE | 199 22 158 | 11/2000 |
| DE | 102 11 310 | 10/2003 |
| DE | 10 2005 030 287 | 1/2007 |
| DE | 10 2005 030 288 | 1/2007 |
| EP | 0 601 483 | 6/1994 |
| EP | 0 685 749 | 12/1995 |
| EP | 0 887 398 | 12/1998 |
| EP | 1 628 147 | 2/2006 |
| GB | 2 166 755 | 5/1986 |
| JP | 2003-256903 | 9/2003 |
| JP | 2003-262724 | 9/2003 |
| JP | 2004-338257 | 12/2004 |
| JP | 2005-534112 | 11/2005 |
| JP | 2006-524849 | 11/2006 |
| NZ | 507 342 | 8/2002 |
| RU | 2261479 | 9/2005 |
| RU | 2274900 | 4/2006 |
| RU | 2321065 | 3/2008 |
| RU | 2364517 | 8/2009 |
| RU | 2377132 | 12/2009 |
| WO | WO-94/22976 | 10/1994 |
| WO | WO-95/08786 | 3/1995 |
| WO | 97/06016 | 2/1997 |
| WO | WO-97/30136 | 8/1997 |
| WO | WO-00/47694 | 8/2000 |
| WO | WO2004/011273 | 2/2004 |
| WO | WO-2005/105473 | 11/2005 |
| WO | WO-2006/063926 | 6/2006 |

OTHER PUBLICATIONS

International Preliminary Report on Patentability for PCT/IB2007/003002, dated Sep. 1, 2009.

Gerogian Office Action in counterpart Georgian Appln. No. AP 2007 011773 (Nov. 8, 2011) (with translation).

New Zealand Office action that issued with respect to patent family member New Zealand Patent Application No. 583960, mail date is Jun. 22, 2011.

Singapore Office action that issued with respect to patent family member Singapore Patent Application No. 201002228-3, mail date is Jun. 15, 2011.

Textbook, Chapter 14 “Fluid Mechanics,” p. 442; and Chaper 36 “Image Formation,” p. 1146.

Korea Office Action conducted in counterpart Korea Appln. No. 10-2014-7001743 (Feb. 27, 2014) (w/ English language translation).

Korea Notice of Allowance in counterpart Korea Appln. No. 10-2010-7007534 (Apr. 4, 2014) (w/ English language translation).

Chinese Reexamination conducted in counterpart Chinese Appln. No. 2007801010719 (Jun. 24, 2014) (w/ English translation).

Philippine Office Action conducted in counterpart Philippine Appln. No. 1/2010/500585 (Aug. 20, 2013).

Pakistan Office Action conducted in counterpart Pakistan Appln. No. 1169/2008 (May 2, 2013).

International Search Report and Written Opinion issued in PCT/IB2007/003002 on Jul. 7, 2008.

* cited by examiner

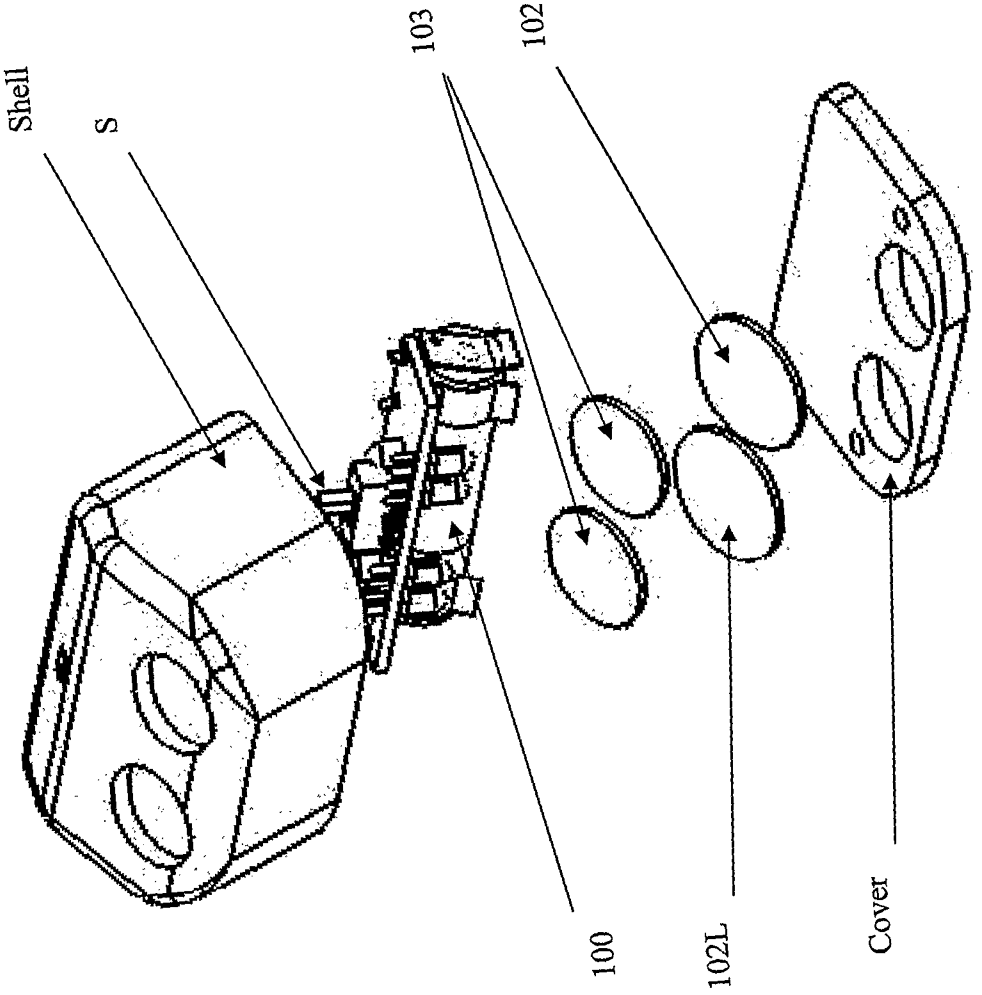
.g. 7b

SECURITY MARKING AUTHENTICATION DEVICE

RELATED APPLICATIONS

This application is the U.S. National Stage of International Application No. PCT/IB2007/003002, filed Oct. 9, 2007. The entire teachings of the above applications are incorporated herein by reference.

FIELD OF INVENTION

The invention is in the field of the authentication of a document or item. It concerns a device for the visual authentication of the presence, on said document or item, of a circular polarizing security marking. Said device is based on a special light source comprising circular polarizing filters.

STATE OF THE ART

In the field of value document certification or identity control, authentication of the document is often required. Authentication is establishing or confirming something or someone as appertaining to a certain class, with the help of a determined feature (security element, marking) which is indicative of said appertaining.

The present invention discloses an authentication device, used to authenticate a document or item carrying a circular polarizing security marking, which can be printed or coated using an ink or coating composition comprising circular polarizing particles, or applying a laminate or film (foil) having circular polarizing properties.

Throughout the present description, the term “authentication device” designates a device which is used to authenticate a document or item comprising a circular polarizing security marking.

According to the invention, the circular polarizing properties are preferably embodied by a cholesteric liquid crystal polymer (CLCP). Such polymer selectively reflects one of both circular polarized light components; that means that within a determined wavelength range, light having a determined circular polarization state (left- or right-handed, depending on the polymer) is predominantly reflected.

Cholesteric liquid crystal materials are characterized by an internal helical supramolecular texture, which causes a periodic modulation of the refractive index, wherein the periodicity is comparable with the wavelength of visible light. As a consequence, such materials act as optical diffraction gratings and reflect light of particular wavelengths, appearing colored to the eye. The helical sense of the texture (right or left) causes light of one circular polarization state to be predominantly reflected (cf. J. L. Fergason, “Cholesteric Structure-I Optical Properties”, in “Molecular Crystals”, Vol 1, pp 293-307 (1966)). Cholesteric liquid crystal materials have been proposed as coloring means in U.S. Pat. No. 3,766,061.

To achieve color properties which are stable in time and independent of the temperature, it is advantageous to “freeze” the cholesteric helical texture by chemical cross-linking, i.e. by polymerizing the liquid crystal material in the desired state, hereby obtaining a cholesteric liquid crystal polymer (CLCP). Photo-polymerized cholesteric liquid crystal materials have been disclosed in GB2166755A. Pigments made of cholesteric liquid crystal polymer are disclosed in EP 0 601 483 A1; such pigments can be used in coating compositions and as a security marking. WO 94/22976 A1 and WO 95/08786 A1 are particularly directed to such coatings and security markings. Further documents relevant in this context are DE 44 18 490 A1, EP 0 685 749 A1, WO 97/30136 A1, U.S. Pat. No. 6,597,426, EP 0 887 398 A1, U.S. Pat. No. 6,570,648, WO 00/47694 A1, DE 199 22 158 A1, U.S. Pat. No. 6,641,874, WO 2005/105473 A1, and WO 2006/063926 A1.

An authentication device for the machine-detection of security markings comprising cholesteric liquid crystal material is disclosed in DE 102 11 310 A1. According to this document, the marking is illuminated using one or several spectrally restricted light sources, e.g. ‘color’ light emitting diodes, and the light reflected by the marking is checked by a detecting unit for the presence of circular polarization. The device is not enabled, however, for the visual authentication of cholesteric liquid crystal markings.

According to the prior art, the visual authentication of a circular polarizing security marking on a document or item is performed under “ambient light” with the help of left- and right-circular polarizing filters, comparing the respective aspects of the marking as seen through the left- and through the right-circular polarizing filter, respectively. This method gives satisfactory results only as long as the illuminating light is of good spectral quality. In many circumstances the ambient light level is furthermore low (less than 50 lux, e.g. at night outdoors events, nocturnal identity controls, etc.), which does not facilitate the authentication operation.

SUMMARY OF THE INVENTION

The present invention discloses an authentication device for the easy visual authentication of a document or item comprising a circular polarizing security marking.

In an important aspect of the present invention, the authentication device comprises a special light source, able to emit left- and right-circular polarized light. This light source is characterized in that it produces two beams of light which have opposite circular polarization handedness (i.e. a left-circular and a right-circular polarized beam) and which are separated, either in space or in time.

The authentication device for the visual authentication of a document or item comprising a circular polarizing security marking comprises thus at least one light source, and at least one circular polarizing filter, preferably selected from the group consisting of the left-circular and the right-circular fixed polarizing filters, and of the mechanical and the electro-optic variable circular polarizing filters, characterized in that said device emits left- and right-circular polarized light for the illumination of said marking on said document.

In a first embodiment, two continuous, preferably adjacent beams of light of opposite circular polarization, having about the same intensity, simultaneously illuminate zones of the document or item comprising the circular polarizing marking. In a preferred version of this embodiment, the said zones of the document are adjacent, so as to facilitate the comparison of the appearance of the marking under both types of polarized light.

In the context of the present description, illuminated zones of the document refers to areas which are actually illuminated by the light beams, and not to featured areas preexisting on the document.

In a second embodiment, a single beam of light of alternating opposite circular polarization, having about constant intensity, is directed at the zone of the document or item comprising the circular polarizing marking.

In both cases, the visual appearance of the circular polarizing marking changes as a function of the polarization handedness of the incident light. The document or item can thus be authenticated by passing the light beam of the authentication device over the marking, respectively changing the polarization handedness of the light beam, and visually observing the appearance/change in appearance of the marking under each type of polarized light, if necessary comparing it to the appearance/change in appearance of a certified authentic marking under the same conditions.

A more quantitative assessment of the polarized light reflected by the marking may also be done with the help of an appropriate photoelectric detector (e.g. a photodiode) with the optional assistance of further optical elements (lenses, filters, etc. . . . ), and of a corresponding automated processing of the measured detector signal by a processing device.

DETAILED DESCRIPTION

The authentication device according to the present invention comprises a special light source that emits circular polarized light. The device comprises at least one circular polarization filter, and may in particular be a modified light pen, a modified flashlight, or a particularly designed authenticity validator device, so as to assure portable application.

An important aspect of the present invention consists in the use of a Light-Emitting Diode (LED) as a light source. White and 'color'-LEDs are currently proposed by number of suppliers (Philips, Nichia, etc. . . . ) as high efficiency light sources for portable applications. White LEDs emit light all over the visible spectral domain (i.e. 400 nm-700 nm). 'Color'-LEDs emit light in a particular, narrow wavelength range—about 50 nm large—in the UV, visible or IR spectral domain.

LED efficiencies can be as high as 150 lumen/W of electric power, i.e. more than 10 times the efficiency of an incandescent lamp. This results in a 10 times increased autonomy, compared to a light bulb, which is an essential advantage for portable application, where autonomy is required. Typical operating conditions for white LEDs in flashlights and light torches vary from 20 mA at 3.2 to 3.6 V (for 25 to 30 cd light output) to up to 1 A (for more than 100 lumen light output).

The choice of a LED in the present invention allows thus to obtain an important advantage over the prior art, because i) the light source, and hence the illumination conditions of the marking, are precisely defined and remain the same for all authentications made with the device, and ii) the autonomy of the authentication device at continuous use can be up to one week, compared to less than one day for an incandescent lamp, using a set of classic commercial AAA batteries.

In a first embodiment of the authentication device, with reference to FIG. 1, a split right/left circular polarizing filter (FL, FR), composed of two semicircular filter plates, and disposed in front of a single white light source L1, is used to obtain two adjacent beams of light of opposite circular polarization, simultaneously illuminating adjacent zones (M1, M2) of the marking (M). A positive lens or Fresnel lens (LE) may be optionally part of the authentication device. The lens is disposed between the polarization filters and the marking, at distances d1, d2, respectively, from the filters and the marking, so as to form an image of the filters in the plane of the marking. In this way, two neatly separated, adjacent zones of oppositely polarized illumination on the marking are obtained. The filters are disposed totally inside the authentication device, which comprises L1, FL/FR and LE, inside a same containment.

Figure 2A:
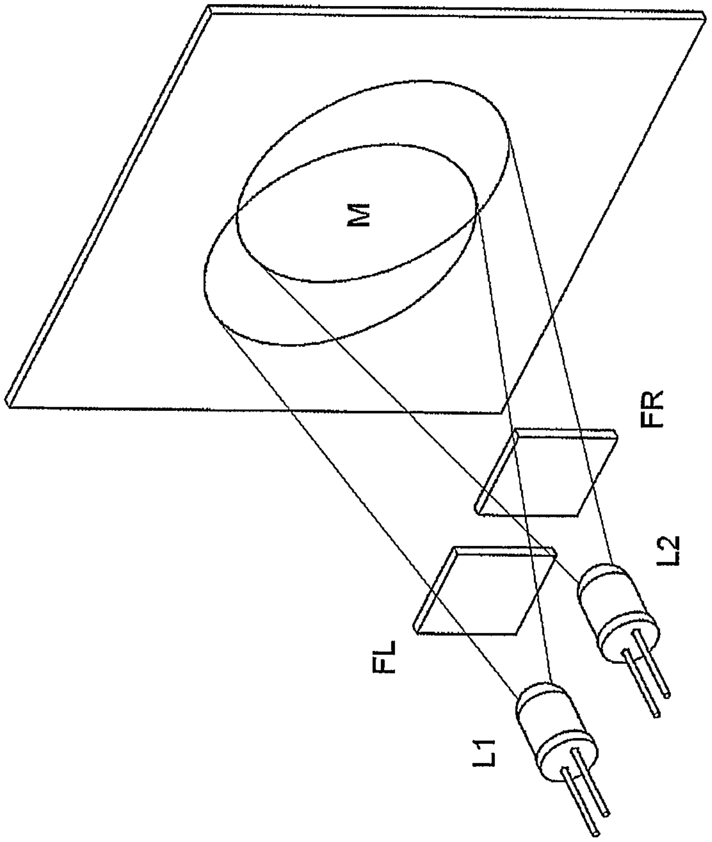

In a second embodiment of the authentication device, with reference to FIG. 2*a*, two white light sources (L1, L2), having left (FL) and right (FR) polarizing filters, respectively, are switched on and off in an alternating way, illuminating the marking (M) with alternating left and right circular polarized light.

The alternating circular polarization of the light, as known to the skilled person, can also be achieved in other ways, one of them being a mechanical changing of either handedness filters, or of filter handedness. This latter can, e.g. be accomplished by a rotating polarization filter component, i.e. a rotating lambda/4 plate in front of a static linear polarizing filter, or by a rotating linear polarizing filter behind a static lambda/4 plate. Mechanical polarization changing allows the use of a single light source, yielding the same, well-defined characteristics for both, the left- and the right-circular polarized illumination. This is particularly true in the case of a rotating filter component.

Figure 2B:
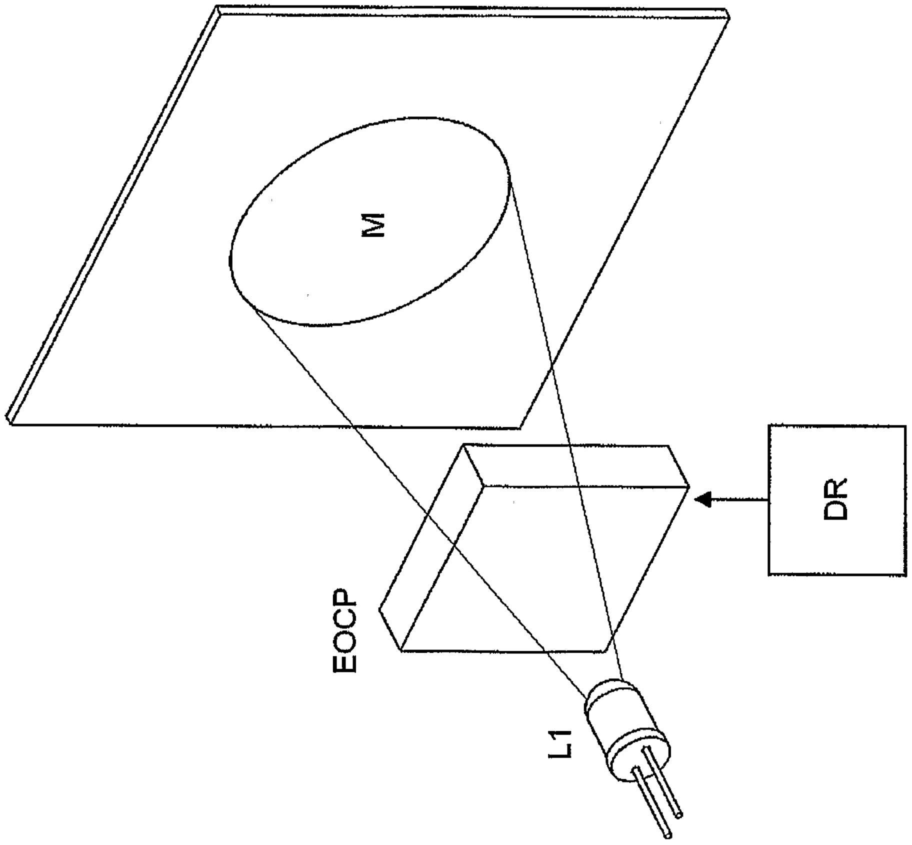

In a modification of the second embodiment, with reference to FIG. 2*b*, instead of a pair of left and right circular polarizing filters, a single electro-optic circular polarizer (EOCP), as described in DE 102 11 310, in conjunction with a single white light source (L1) is used to generate the alternating left and right circular polarized illumination of the marking (M). The electro-optic circular polarizer (EOCP) is connected to an electric driver unit (DR) controlling the polarization state (left- or right-circular) of the EOCP.

Figure 2C:
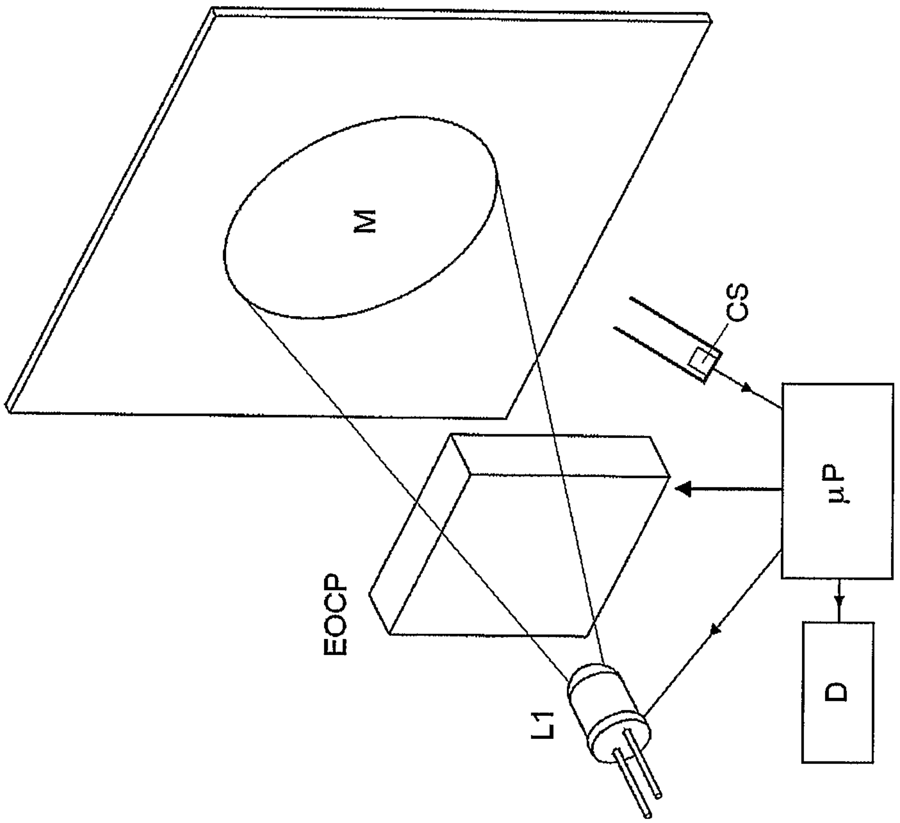

In still another modification of the second embodiment, applicable to both versions outlined above, and with reference to FIG. 2*c*, a photoelectric cell (photocell), in particular a color sensor (CS), is used to determine the intensity of the light reflected by the marking (M). The signal of the color sensor is treated by a microprocessor (μP), which also switches on and off the light sources (L1, L2), respectively drives the electro-optic circular polarizer (EOCP), and which evaluates the reflected light intensity and color as a function of the selected illumination conditions, as well as of predefined internally stored reference values, and puts out an authentication result at a display (D). The result can indicate either the simple presence or absence of a circular polarizing material, or also give additional information about the color of said polarizing material.

Figure 3A:
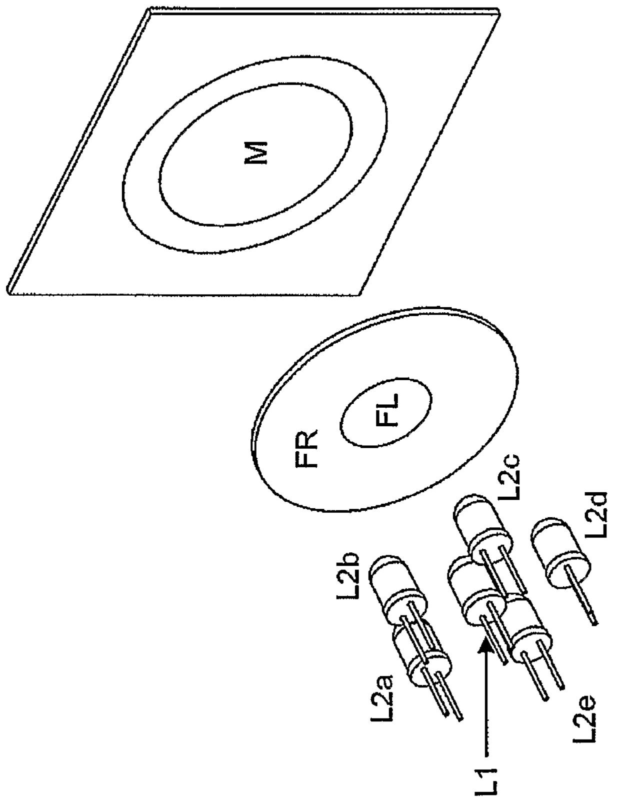

In a further embodiment, with reference to FIG. 3*a*, a first white light source (L1), having a left circular polarizing filter (FL), is disposed on the optical axis of the authentication device, and a plurality of (i.e. at least two) second white light sources (L2*a*, L2*b*, . . . ), having right circular polarizing filters (FR), are disposed around the said first light source (L1). The polarization filters may be embodied as concentric plates (FL, FR), and the order of the polarizing filters may also be reversed. An optional lens may be present in the beam path, but preferably, each of the light sources (L1, L2*a*, L2*b*, . . . ) has its own, individual lens for shaping its light output into a beam.

Figure 3B:
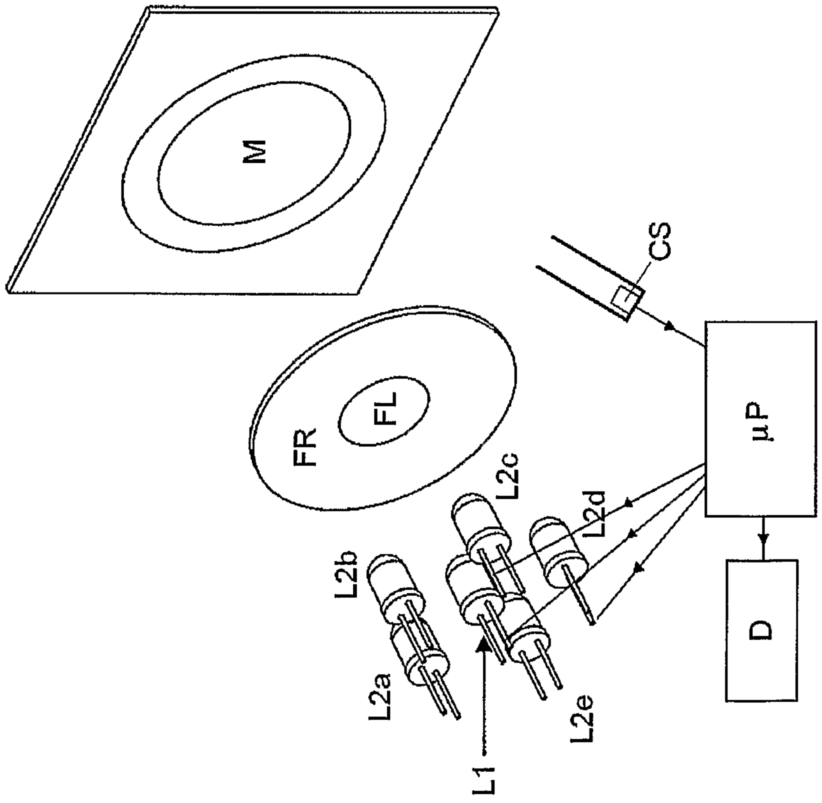

In operation, the first light source and the plurality of second light sources are alternatively switched on and off, illuminating the marking with alternative beams of left and right circular polarized light of preferably the same light intensity. The present embodiment can, as outlined above, and with reference to FIG. 3*b*, furthermore be associated with a photoelectric cell (photocell), in particular a color sensor (CS), a microprocessor (μP), and a display (D), for the automated determination and evaluation of the intensity and color of the light reflected by the marking.

The light sources used in the embodiments outlined above can furthermore be chosen as spectrally selective light sources, such as 'color'-LEDs, emitting light in a particular, narrow wavelength range—about 50 nm large—in the UV, visible or IR spectral domain, or laser diodes (LD) of determined wavelengths.

In a fourth embodiment, with reference to FIG. 3*a*, a first white light source (L1), having a first polarization filter (FL), and a plurality of different second, spectrally selective (color) light sources (L2*a*, L2*b*, . . . ) having second polarization filters (FR), are used in conjunction with each other. In a variant of this embodiment, the first light source can also be a spectrally selective light source.

Figure 4A:
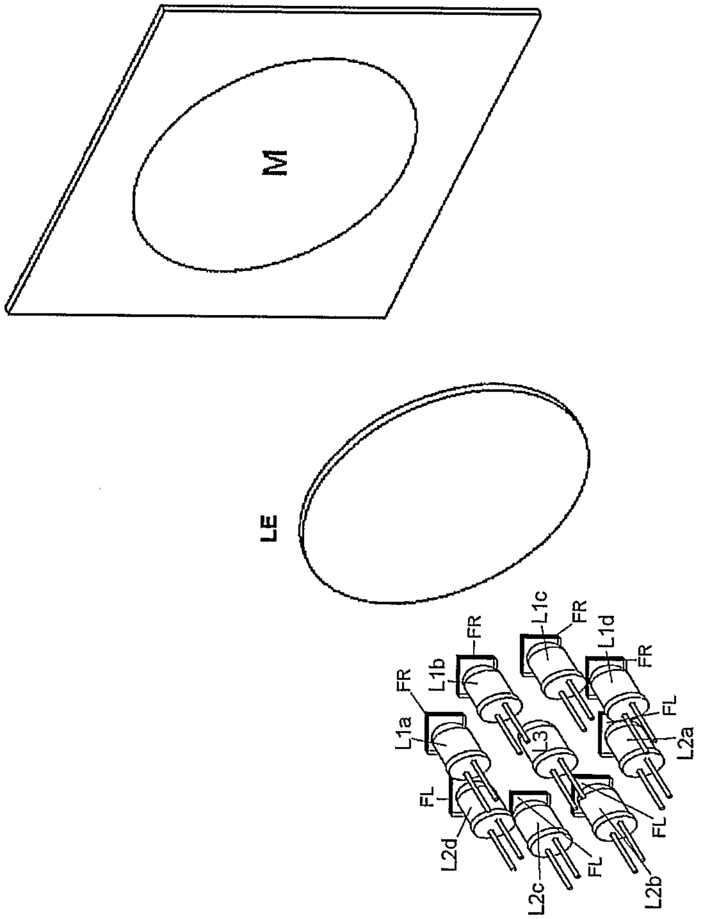

In still another embodiment, with reference to FIG. 4*a*, a plurality of first, different spectrally selective (color) light sources (L1*a*, L1*b*, . . . ) having first polarization filters (FR), and a plurality of second, different spectrally selective (color) light sources (L2*a*, L2*b*, . . . ), having second polarization filters (FL), are used in conjunction with each other.

In operation, the light sources are alternatively switched on and off, and the effect of illuminating the marking (M) with light of left- and right-circular polarization of different color can be visually judged. A lens (LE) may be optionally present, to focus the light onto the marking (M). A further, unpolarized white light source (L3) may also be provided to illuminate the marking under normal reading conditions.

Figure 4B:
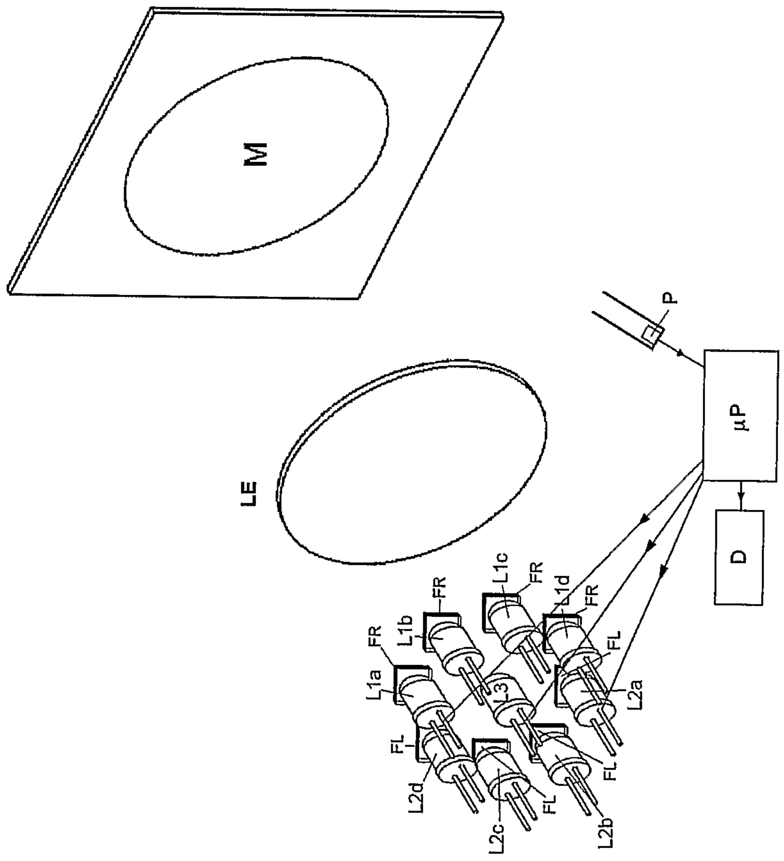

In an alternative version of the embodiment, according to FIG. 4*b*, a simple photoelectric cell (photocell) (P) is used to determine the intensity of the light reflected by the marking for the different colors and polarizations. The signal of the photocell is treated by a microprocessor (μP), which switches on and off the light sources (L1*a*, L1*b* . . . , L2*a*, L2*b* . . . , L3), and which evaluates the reflected light intensity as a function of the selected illumination conditions, as well as of predefined internally stored reference values, and which puts out an authentication result at a display (D).

Throughout this invention, the circular polarizing filters can also be combined with color filters, to select determined spectral domains.

The illumination strength on the marking (M) at working distance is preferably not less than 50 Lux, more preferably not less than 500 Lux. The working distance is noteworthy defined as the distance at which the authentication device should be placed from the document or item to inspect the marking under optimal conditions. In embodiments using simultaneous illumination or adjacent beams, the working distance is the distance at which an image of the polarization filters is obtained in the plane of the marking. The working distance is chosen, depending on the embodiment, between 1 cm and 20 cm, more preferably between 2 cm and 10 cm.

The authentication device may noteworthy also be laid out as an automated Yes/No validator comprising, in addition to the polarized light source, a photocell (P), with optional filters, a processor (μP), control switches and a display device (D), to put out the result of the automated authentication. A firmware embedded in the said microprocessor (μP) provides the functionalities of automatically: switching on/off the LEDs, reading out the signal from the photocell (P), processing and storing the read out signal values, deriving an authentication result, and displaying the authentication result.

The preferred embodiment of the authentication device is a small, lightweight, handy and robust device.

In a preferred embodiment, the authentication device has the form of an elongated cylinder or bar, preferably having a length of the order of 10 cm. Inside the cylinder or bar, which preferably has a cross section of the order of 1 to 5 square centimeters, are disposed: the light sources, the filters, and optional further optical elements, together with the battery serving as the power supply, and, if required, the control electronics and logic. The required switches and indicators, serving as the user interface, are disposed ergonomically at the back end and/or the outer surface of the cylinder or bar; the light output being through its front end.

In a further preferred embodiment, the authentication device is made from a material of the group consisting of the plastic materials, the stainless steels, aluminum and the aluminum alloys; preferably the whole device does not weigh more than 100 g.

In still another preferred embodiment, the authentication device has the form of a box, preferably of the order of 50×40×30 mm, to be placed onto the marking on the document to be authenticated. The said box comprises two windows, allowing the human user to look at the marking under left and right circular polarized illumination, respectively. Inside the box are disposed: the light sources, the filters and optional further optical elements, together with the battery serving as the power supply, and, if required, the control electronics and logic. The required switches and indicators serving as the user interface are disposed ergonomically at the outer surface of the box; the light output illuminating the document is through windows facing the marking, corresponding to the said viewing windows.

The invention is now further illustrated with the help of figures and exemplary embodiments.

FIG. 1: schematically depicts a authentication device according to the present invention, comprising a single white light source (L1) and two semicircular left- and right-circular polarizing filters (FL, FR), and an optional lens (LE), to produce two adjacent zones (M1, M2) of simultaneous opposite circular polarized, continuous illumination on a marking (M), for the assisted visual authentication of said marking.

FIG. 2: schematically depicts authentication devices according to the present invention, for the alternate illumination of a marking (M) with opposite circular polarized light:

a) using first and second white light sources (L1, L2), in conjunction with first and second left- and right-polarizing filters (FL, FR), for the assisted visual authentication of a marking (M);
b) using a single white light source (L1), in conjunction with an electro-optic circular polarizer (EOCP) and a driver unit (DR), for the assisted visual authentication of a marking (M);
c) using one of the embodiments a) or b) with an additional color sensor (CS), a microprocessor (μP) and a display (D), for the automated authentication of a marking (M).

FIG. 3 schematically depicts an alternative authentication device according to the present invention, for the alternate illumination of a marking (M) with opposite circular polarized white light:

a) using a single first white light source (L1), having a first circular polarizing filter (FL), and a plurality of second white light sources (L2*a*, L2*b*, . . . ), having second circular polarizing filters (FR), disposed around the first light source (L1), for the assisted visual authentication of a marking (M);
b) using an additional color sensor (CS), a microprocessor (μP) and a display (D), for the automated authentication of a marking (M).

FIG. 4 schematically depicts an alternative authentication device according to the present invention, for the alternate illumination of a marking (M) with opposite circular polarized colored light:

a) using a plurality of first, different spectrally selective (color) light sources (L1*a*, L1*b*, . . . ) having first polarization filters (FR), and a plurality of second, different spectrally selective (color) light sources (L2*a*, L2*b*, . . . ), having second polarization filters (FL), and optionally a third, unpolarized white light source (L3), and optionally a lens (LE), for the assisted visual authentication of a marking (M);

b) using an additional photocell (P), a microprocessor (μP) and a display (D), for the automated authentication of a marking (M)

Figure 5:
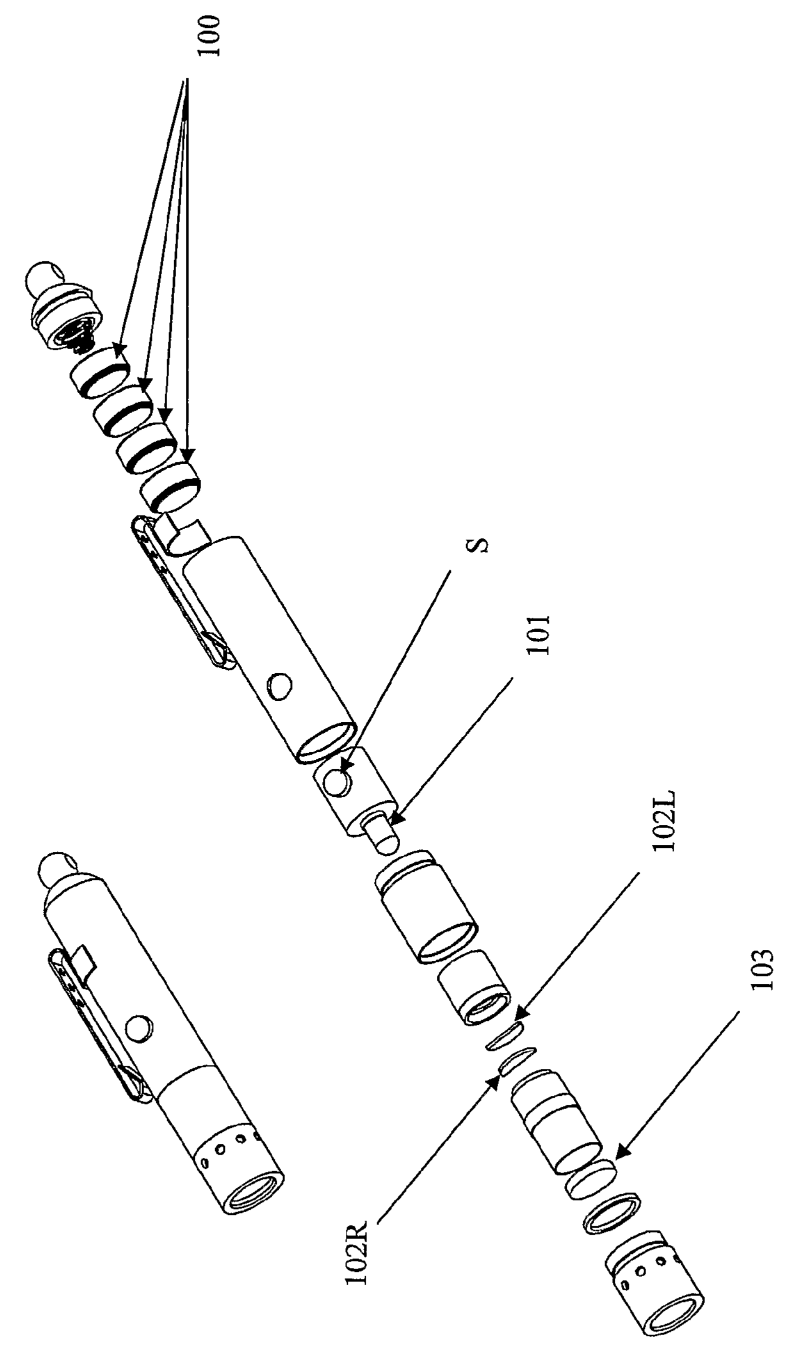

FIG. 5: shows an exploded view of a first embodiment of an authentication device according to the present invention: the device is a modified flashlight, comprising, in a cylindrical aluminum housing, a lens (103), semicircular left- and right-polarizing filters (102L, 102R), a white light source (101), an on-off switch (S), as well as batteries (100), the device producing two adjacent, continuous, opposite circular polarized beams of light on a document under test.

Figure 6:
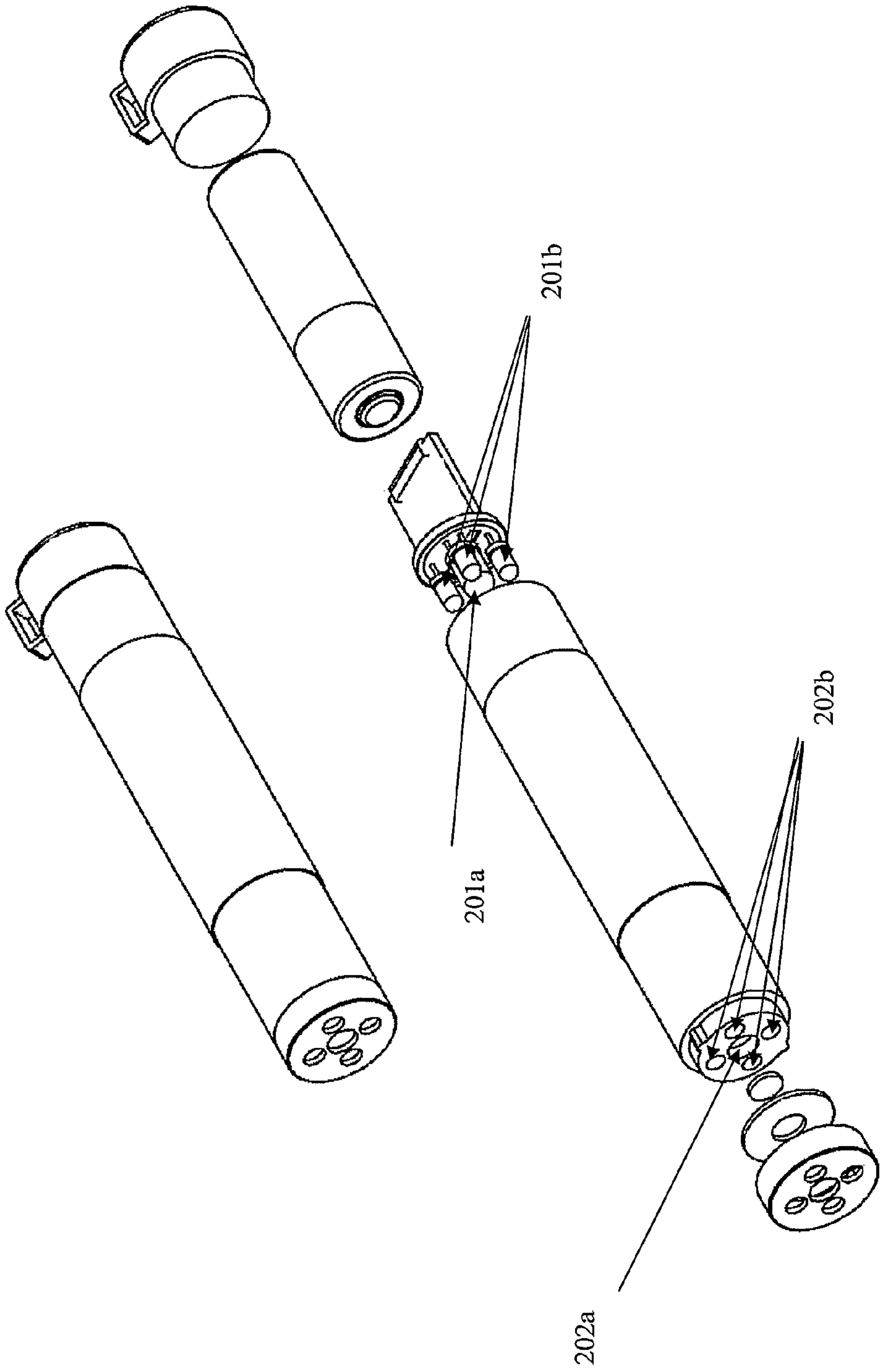

FIG. 6: shows an exploded view of a second embodiment of an authentication device according to the present invention: the device is a modified flashlight comprising, in a cylindrical aluminum housing, a first white light source (201*a*) having a first polarization filter (202*a*), surrounded by four second white light sources (201*b*) having second polarization filters (202*b*), the device producing alternate opposite circular polarized illumination on a document under test.

FIG. 7: shows a third embodiment of an authentication device according to the present invention, laid out as a validator box, comprising two separate, but similar units for viewing a marking (M) under left- and right-circular polarized light:

a) shows a schematic cross-section through a unit of the validator box, comprising a white light source (101), a circular polarizing filter (102), and a Fresnel lens (103);
b) shows an exploded view of the validator box, illustrating the position of the switch (S) and of the battery (100);
c) shows the shape of the validator box, illustrating a possible design.

EXEMPLARY EMBODIMENTS

With reference to FIG. 5, in a first embodiment, used for the assisted visual authentication, light is provided by a LED (101) (a white LED, B5B-430-JB, Roithner, Vienna) and focused onto the marking by a lens (103) (304.OM.3 plastic lens, diameter 16.5 mm, f.l. +30 mm). Between the LED and the lens are disposed two semicircular circular-polarizing filters (102L, 102R) of opposite handedness (left and right, respectively). The distance between the filters and the lens was chosen such that an image of the filters is formed on the opposite side of the lens at 5 cm distance, where the item or document carrying the marking is positioned for inspection. This renders visible the separation line between the simultaneously illuminated areas of opposite polarization, which are in this way properly defined. A mask can additionally be placed on the filters so as to project a logo or a text, instead of just a plain beam. The whole device was embodied in an aluminium cylinder, 80 mm long and 14 mm in diameter. In addition to its convenience and compactness, this device offers the advantage that the filters are concealed inside a device, which otherwise looks like a normal light pen; hence, an outside observer does not necessarily realize what kind of special properties of the item or document are being checked.

The use of an LED light source provides the device with an important autonomy, the battery is a simple AAA battery such as sold on the market.

With reference to FIG. 6, in a second embodiment, also used for the assisted visual authentication, light is provided by five LEDs (201) (Roithner Vienna) a first one (a white LED, B5B-430-JB) located on the optical axis, the other four (a blue LED B5B-437-IX 470 nm, a green LED B5B-433-20 572 nm, a red LED B5B-435-TL 625 nm and IR LED LED850-04VP 850 nm) in a tight ring around the said first LED. The first LED is provided with a circular polarizing filter of right handedness (202) and the other four LEDs are provided with each a circular polarizing filter of left handedness (i.e. opposite to the first one) (203). The inner and outer diodes are alternatively switched on and off at regular time intervals, such that the item under inspection is alternately illuminated with left polarized and right polarized light. The number and the arrangement of the diodes in the device are not critical, as long as the two sets illuminate the area of interest with similar intensities. The whole device was embodied in an aluminium cylinder, 100 mm long and 18 mm in diameter.

Figure 7A:
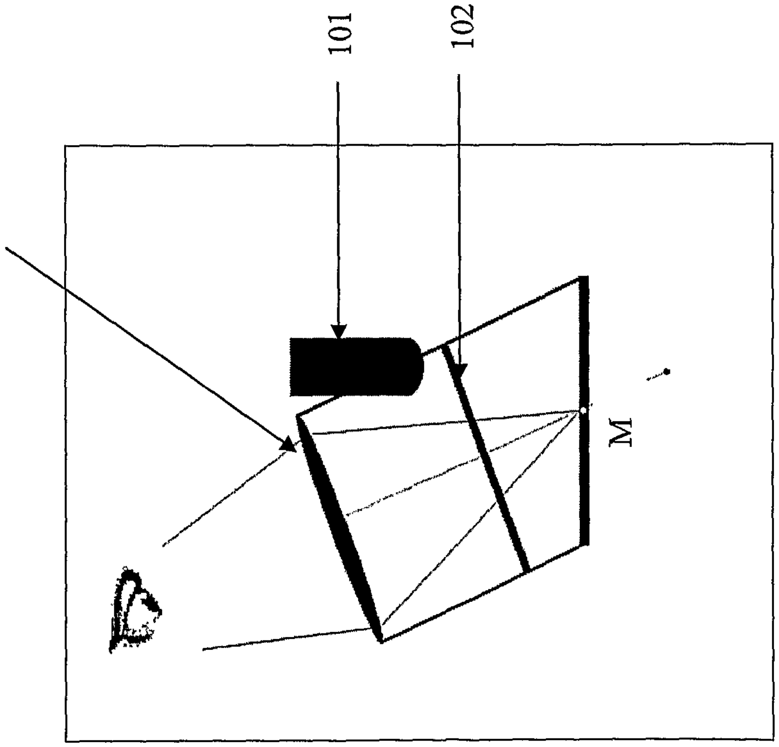
Figure 7C:
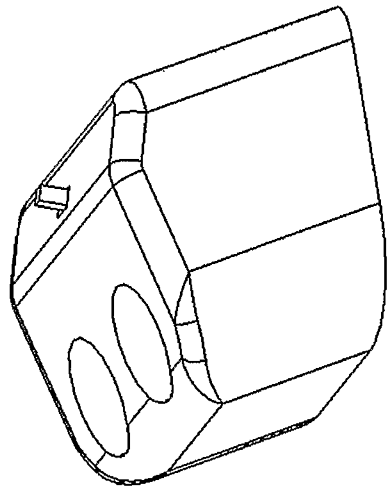

With reference to FIG. 7*a*, in a third embodiment having the form of a validator box, also used for the assisted visual authentication of a document or item, two different regions of the document or item under inspection are illuminated by separate LEDs through circular polarizing filters of opposite polarization (one region through an R-, the other through an L-polarizing filter). Each region is visually inspected through the same polarizing filter used for polarizing the illumination, and a magnifying lens (Fresnel lens) is provided to enhance the visibility of details on the document or item. This embodiment is particularly useful if the marking on the document or item displays only a small polarization effect, or if the marking or some details of it are of very small dimensions. The validator box was embodied in a plastic casing of about 50×35×25 mm dimensions. FIG. 7*b* shows an exploded view of the complete validator box, and FIG. 7*c* a view of the box as seen from the outside.

The authentication device of the present invention can be used for the authentication of currency, value papers, vouchers, identity documents, access documents, event tickets, transportation tickets, tear-tapes, product labels, or packaging materials.

A method of visual authentication of a document or item comprising a circular polarizing security marking is characterized by the steps of:

a) illuminating said marking on said document using a device according to the present invention, emitting left- and right-circular polarized light;
b) visually judging the light reflected by the said marking, hereby authenticating the document or item.

In a variant of the method, preferably adjacent zones of the document or item comprising the circular polarizing marking are simultaneously illuminated by two beams of light of opposite circular polarization.

In another variant of the method, the document or item comprising the circular polarizing marking is illuminated by a single light beam of alternating circular polarization.

In still another variant of the method, the light source is selected from the group consisting of the white Light-Emitting Diodes (white-LEDs) and the 'color' Light-Emitting Diode (color-LEDs).

A method of automated authentication of a document or item comprising a circular polarizing security marking, using a device according to the present invention, emitting left- and right-circular polarized light, wherein the device additionally comprises a photoelectric cell chosen from the group consisting of the photocells and the color sensors, a microprocessor (μP), and a display (D), is characterized by the automated steps of:

a) switching on/off the light sources by the microprocessor (μP));
b) reading out the signal from the photocell (P) or the color sensor (SC) into the microprocessor (μP);
c) processing and storing the read out signal values in the microprocessor (μP);

d) deriving an authentication result on the basis of a pre-established criterion stored in the microprocessor (μP);

e) putting out the authentication result on the display (D).

The examples and figures given in the present description are illustrative only and shall not be construed as limiting the scope of the invention in any way.

The invention claimed is:

1. A visual authentication device for the visual authentication of a document or item having a circular polarizing security marking, said device comprising:

at least one light source and at least one circular polarizing filter structured and arranged to emit left- and right-circular polarized light onto the document for the illumination of the said marking, wherein either:

two beams of light of opposite circular polarizations are produced to simultaneously illuminate said marking; or a single beam of light of alternating opposite circular polarization is produced to illuminate said marking, which thereby allows a user to visually observe with the naked eye the appearance/change of appearance of the marking under illumination by each type of polarized light.

2. The visual authentication device according to claim 1, wherein the circular polarizing filter is selected from the group consisting of the left-circular and the right-circular fixed polarizing filters, and of the mechanical and the electro-optic variable circular polarizing filters.

3. The visual authentication device according to claim 1, wherein the light source is selected from the group consisting of the white Light-Emitting Diodes (white-LEDs) and the 'color' Light-Emitting Diode (color-LEDs).

4. The visual authentication device according to claim 1, wherein a positive lens or Fresnel lens is used to concentrate the light of the light source onto the document or item.

5. The visual authentication device according to claim 1, wherein the illumination strength at working distance on the marking (M) is not less than 50 Lux, more preferably not less than 500 Lux.

6. The visual authentication device according to claim 1, wherein the authentication device has the shape of a cylinder or a bar.

7. A method of visually authenticating, with the visual authentication device according to claim 1, currency, value papers, vouchers, identity documents, access documents, event tickets, transportation tickets, tear-tapes, product labels, or packaging materials.

8. A method of visually authenticating a document or item having a circular polarizing security marking, said method comprising:

illuminating said marking on said document with left- and right-circular polarized light from the visual authenticating device according to claim 1; and visually judging with the naked eye the light reflected by the illuminated marking in order to authenticate the document or item.

9. The visual authentication device according to claim 1, wherein the two beams of light of opposite circular polarizations are produced in adjacent zones of the document or item.

* * * * *

UNITED STATES PATENT AND TRADEMARK OFFICE

CERTIFICATE OF CORRECTION

PATENT NO. : 8,985,463 B2
APPLICATION NO. : 12/681753
DATED : March 24, 2015
INVENTOR(S) : Eric Decoux et al.

It is certified that error appears in the above-identified patent and that said Letters Patent is hereby corrected as shown below:

On the Title Page, Page 1, at Item (73) Assignee, of the printed patent, “SICPA Holding SA” should read --SICPA HOLDING SA--.

On the Title Page, Page 2, References Cited, Other Publications (column 2, line 12) of the printed patent, “Gerogian” should read --Georgian--.

Signed and Sealed this
Twenty-sixth Day of January, 2016

Michelle K. Lee

Michelle K. Lee
*Director of the United States Patent and Trademark Office*